(12) United States Patent
Sabi et al.

(10) Patent No.: US 6,572,947 B2
(45) Date of Patent: Jun. 3, 2003

(54) OPTICAL RECORDING MEDIUM (75) Inventors: Yuichi Sabi, Tokyo (JP); Hidetoshi Watanabe, Chiba (JP); Masanobu Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 59 days.

(21) Appl. No.: 09/816,046

(22) Filed: Mar. 23, 2001

(65) Prior Publication Data
US 2002/0001691 A1 Jan. 3, 2002

(30) Foreign Application Priority Data

Mar. 27, 2000 (JP) ........................................ 2000-086687

(51) Int. Cl.⁷ ................................................ B32B 3/02
(52) U.S. Cl. .................... 428/64.4; 428/64.4; 428/64.8; 430/270.14
(58) Field of Search ................................ 428/64.1, 64.4, 428/64.8, 457, 913; 430/270.14, 495.1, 945; 369/283, 288

(56) References Cited

U.S. PATENT DOCUMENTS

| | | |
|---|---|---|
| 4,330,883 A | 5/1982 | Ohta et al. |
| 5,627,817 A | 5/1997 | Rosen et al. |
| 6,246,656 B1 * | 6/2001 | Kawakubo ................... 369/112 |

FOREIGN PATENT DOCUMENTS

| | | |
|---|---|---|
| DE | 9716967 | 6/1997 |
| EP | 0458604 | 11/1991 |
| EP | 0847049 | 10/1998 |
| EP | 0874362 | 10/1998 |

* cited by examiner

*Primary Examiner*—Elizabeth Mulvaney
(74) *Attorney, Agent, or Firm*—Sonnenschein, Nath & Rosenthal (57) ABSTRACT

To provide a high density optical recording medium, capable of realizing the complete compatibility with a phase change recording medium with respect to an optical pickup or a drive device, using a short wavelength light for achieving a high recording density. The present invention provides an optical recording medium configuration for directly reading out the change of the reflectance without using the phase modulation method.

An optical recording medium according to the present invention is an optical recording medium having a recording film of a single layer or multiple layer structure on a substrate (1), wherein the recording film is mainly made of an organic substance material layer (2) for absorbing and decomposing a laser beam, and generating the refractive index change as well as the reflectance of the optical recording medium with respect to a reproduction laser beam of a 380 nm to 450 nm wavelength is 15% to 25% before the decomposition, and 0% to 10% after the decomposition.

6 Claims, 10 Drawing Sheets

OPTICAL RECORDING MEDIUM

RELATED APPLICATION DATA

The present application claims priority to Japanese Application No. P2000-086687 filed Mar. 27, 2000, which application is incorporated herein by reference to the extent permitted by law.

BACKGROUND OF THE INVENTION

The present invention relates to an optical recording medium, in particular, it relates to a high density optical recording medium.

Write-once discs using an organic pigment have been standardized as a CD-R (compact disc-recordable), or the like, and they have already been used widely.

In the development of the organic pigment, various aspects, such as the optical characteristics, and the thermal characteristics should be optimized.

Among them, as to the optical characteristics, for example, in the case of the CD-R, and the DVD-R (digital versatile disc-recordable), since they each need to be produced so as to match the standard of the reading dedicated disc of the CD and the DVD, they should be designed so as to have the refractive index of 70% or more in the CD-R, and 60% or more in the DVD-R with respect to the wavelength of a light source. Therefore, it is realized by providing a metal reflection film with a high refractive index, and using an organic material with a low imaginary part of the complex refractive index (absorption coefficient k). Furthermore, in order to have a sufficient modulation degree, the real part of the complex refractive index (refractive index $n_b$) before recording needs to be high.

Moreover, as to the absorption coefficient k, there is another reason. That is, the heat conductivity of an organic pigment is, in general, about 0.2 J/m·s·K, which is extremely lower than a recording material of a photomagnetic disc. Therefore, the temperature can easily be raised at the time of recording, and thus the absorption coefficient k should be provided as low as possible (see the official gazette of Japanese Patent Application Laid-Open (JP-A) No. 7-272314, and the official gazette of Japanese Patent Application Laid-Open (JP-A) No. 7-282465).

As mentioned above, media matching the standard of the ROM (read only memory), such as the CD, and the DVD have conventionally been developed. In contrast, in consideration of the circumstances that the reflectance of a rewritable medium such as a phase change material including the CD-RW (CD-rewritable) cannot be substantially the same as that of the ROM as the principle, a low reflectance is included in the standard for the next generation high density optical discs as the basic standard.

In order to realize such an organic pigment disc with a low reflectance, a problem arises in the above-mentioned conventional configuration.

That is, the reflectance can hardly be restrained at a low level in such a configuration with a reflection film, and when the reflectance is lowered, utilizing the multiple interference, or the like, the absorption ratio of the light is raised extremely so as to generate a problem of heat.

This is partly because dispersion of heat by the reflection film is insufficient due to the low heat conductivity of the organic pigment material.

As a medium configuration coping therewith, that realizing the same reflectance as that of the phase change optical recording medium without using a reflection film for ensuring a sufficient modulation degree has been proposed (for example, see the official gazette of Japanese Patent Application Laid Open (JP-A) No. 6-76359).

Recently, with development toward a shorter wavelength of a light source, a blue violet semiconductor laser (wavelength 380 nm to 450 nm) is to be used practically. By use of the short wavelength laser, a drastically high density of an optical recording medium can be achieved.

However, the conventional optical recording medium with an organic pigment cannot cope with such a short wavelength light source. Moreover, a problem of difficulty in enduring a high energy density in a spot due to the minute laser beam spot by the short wavelength of the laser, and the high numerical aperture (high N. A.) of the optical system is involved.

That is, for example, with the commercialization of a pickup for optical recording and/or optical reproduction (hereinafter referred to simply as an optical pickup) by an optical system of a 0.8 or more N. A. (for example, see P. 131 of K. Osato et al., Digest of Optical Data Storage (Aspen, Colo., 1998), or the like), a measure for a higher energy density is called for.

Moreover, the recording area of the CD-R is provided only in the groove. In this case, the groove width is to be set narrower than the land width. A laser beam irradiation with respect to the groove is directed also over the land part. In the CD-R, as mentioned above, the reflectance thereof is set to be high, that is, the reflectance is set at 60% or more regardless of existence of record so that by detecting reflections from both land and groove at the same time, the effective reflectance change, that is, the recorded information is read out, utilizing the interference effect generated from the displacement of the reflected light phases from each of them by the phase modulation method. Therefore, in the CD-R, the so-called land groove recording mode for recording on both land and groove, cannot be adopted.

Furthermore, on the other hand, a high density can be realized also by providing multiple layers in the information retaining layer. (see P. 197 of K. Kurokawa et al., Digest of International Symposium on Optical Memory/Optical Data Storage (Koloa, Hi., 1999)).

In order to realize this, it is necessary to restrain the reflectance of each layer at a low level and at the same time to make the transmittance high. However, since a recording layer of a rewritable type optical disc made from an inorganic material, in general, has a high absorption coefficient and a low transmittance, it has been difficult to realize multiple layers comprising three or more layers.

SUMMARY OF THE INVENTION

The present invention is to provide an optical recording medium for solving the above-mentioned problems.

That is, the present invention relates to a high density optical recording medium, capable of realizing the complete compatibility with a phase change recording medium with respect to an optical pickup or a drive device, using a short wavelength light for achieving a high recording density.

Moreover, the present invention is to realize a further high density recording medium by enabling adoption of the so-called land groove recording mode, capable of recording on both land and groove.

Furthermore, according to the present invention, since the reflection film as in the conventional organic pigment disc is not used, the reflectance can be restrained as well as a high transmittance can be obtained at the same time so that further higher density can be realized by providing multiple layers.

That is, the present invention provides an optical recording medium configuration for directly reading out the change of the reflectance without using the phase modulation method.

An optical recording medium according to the present invention is an optical recording medium having a recording film of a single layer or multiple layer structure on a substrate, wherein the recording film is mainly made of an organic material and decomposed after absorbing a laser beam to have a refractive index change, and reflectance of the optical recording medium with respect to a reproducing laser beam having a wavelength of 380 nm to 450 nm is 15% to 25% before the decomposition, and 0% to 10% after the decomposition.

That is, an optical recording medium according to the present invention directly reads out the change of the reflectance without using the phase modulation method as mentioned above.

DESCRIPTION OF THE PREFERRED EMBODIMENTS

An optical recording medium according to the present invention provides an optical recording medium configuration for directly reading out the change of the reflectance without using the phase modulation method as mentioned above. As shown in a schematic cross-sectional view of FIG. 1, the basic structure comprises on a substrate 1 a recording film of a single layer or multiple layer structure, mainly made of an organic material for absorbing and decomposing a laser beam, and generating the refractive index change, specifically, an organic pigment layer as well as the reflectance as the optical recording medium with respect to a reproducing laser beam of a 380 nm to 450 nm wavelength is 15% to 25% before the decomposition, and 0% to 10% after the decomposition.

Figures 1, 2:
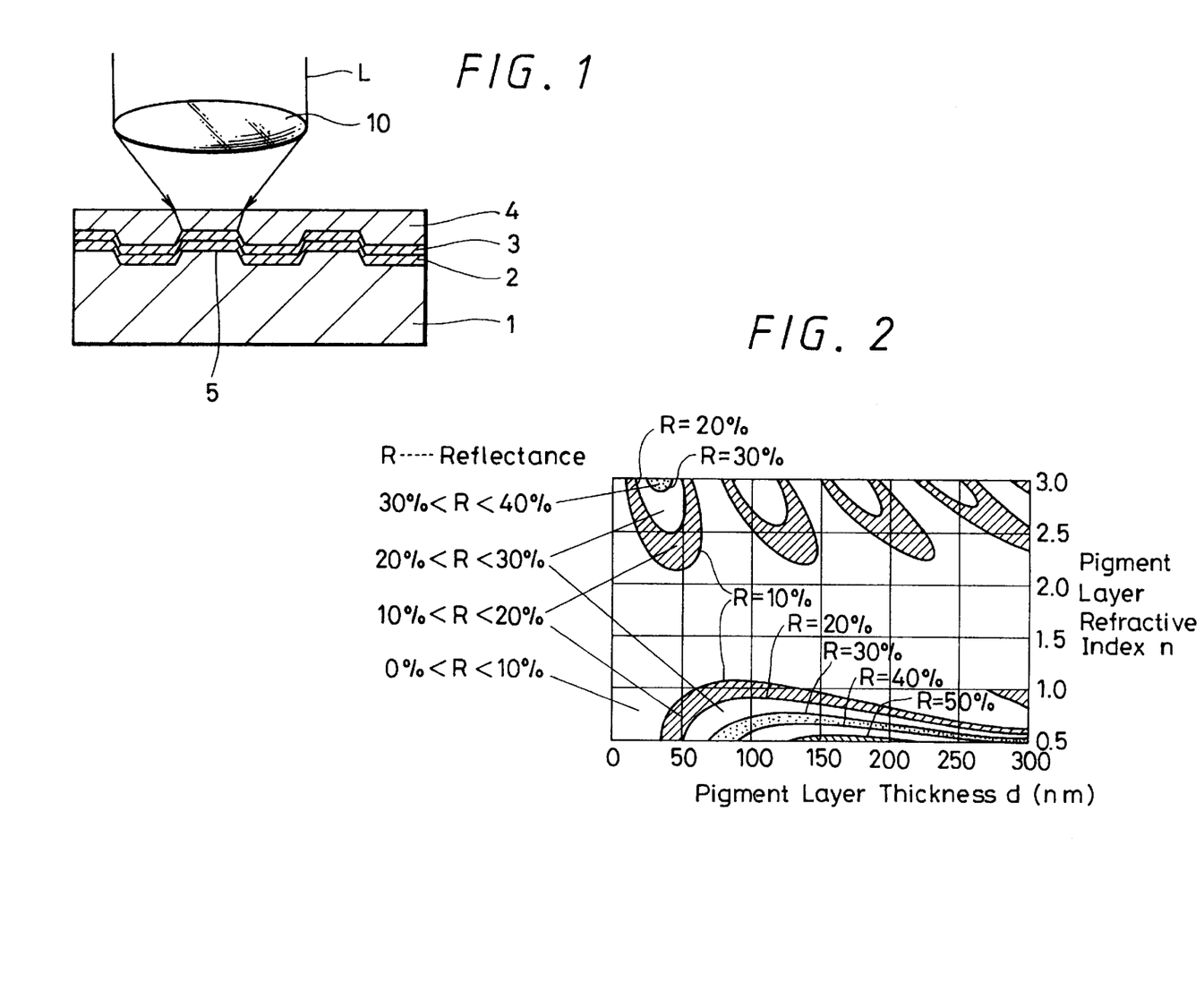
FIG. 1 is a schematic cross-sectional view of an embodiment of an optical recording medium according to the present invention.
FIG. 2 is a graph showing the dependency of the reflectance on an organic-pigment layer (organic material layer) thickness and the refractive index to be provided for explanation of the present invention.

Moreover, a light transmitting layer 4 is formed on the surface thereof. A laser beam L is outputted-from the light transmitting layer 4 side via an optical lens, that is, an objective lens so as to record or reproduce the recording film, that is, the organic material layer.

The light transmitting layer has a 10 $\mu$m to 177 $\mu$m.

The substrate 1 can have a configuration in which a guide groove 5 formed.

Moreover, the so-called land groove recording mode with recording areas formed respectively in the land and the groove can be adopted. Also in this case, the reflectance in each recording area with respect to the reproducing laser beam is set at 15% to 25% before the decomposition, and 0% to 10% after the decomposition.

As the organic material for providing a recording film, a material with the real part of the complex refractive index (refractive index $n_b$) before recording of $1.8 \leq n_b \leq 4.0$ with respect to the reproducing laser beam can be selected.

Moreover, as described later, in some cases, the organic material can have the real part $n_b$ of the complex refractive index before recording of $0.5 \leq n_b \leq 1.2$ with respect to the reproducing laser beam.

Furthermore, the real part of the complex refractive index (refractive index $n_a$) after recording by the decomposition and the real part of the complex refractive index (refractive index $n_b$) before recording are set at $0.16 \leq |n_a - n_b|/n_b \leq 0.62$ with respect to the reproducing laser beam wavelength in the organic substance material.

Moreover, the imaginary part of the complex refractive index (absorption coefficient k) before recording by the decomposition can be $0.01 \leq k \leq 0.1$ with respect to the above-mentioned reproducing laser beam wavelength, and the thickness d can be 50 nm $\leq d \leq$ 250 nm in the organic substance material.

Moreover, the imaginary part of the complex refractive index (absorption coefficient k) before recording by the decomposition can be $0.01 \leq k \leq 0.2$ with respect to the above-mentioned reproducing laser beam wavelength, and the thickness d can be 10 nm $\leq d \leq$ 50 nm in the organic substance material.

The organic material layer can be provided in at least two or more layers, with a light transmitting layer provided between the organic material layers.

Moreover, a metal layer of a 5 nm$\leq$D$\leq$20 nm film thickness D can be provided adjacent to the organic material layer.

The present invention will be explained.

[First Embodiment]

With reference to a schematic cross-sectional view, explanation will be provided.

An optical recording medium according to the present invention has an optical disc configuration for reproducing an information signal recorded on a light recording medium by the light amount change of a reflected light generated by the laser beam irradiation.

The optical disc is provided by forming an organic pigment layer 2, a dielectric layer 3, and a light transmitting layer 4 made of organic material layers comprising a recording film successively on a substrate 1.

The laser beam irradiation in recording and reproduction on the optical disc is executed by irradiation from the front surface side, that is, from the light transmitting layer 4 side.

The tolerance of inclination, that is, the so-called skew margin SM of an optical recording medium, in this example, the optical disk is made smaller by a short wavelength of a laser beam, and a high N. A. In order to compensate this, the so-called surface reading type mode for executing the laser beam irradiation from the thin transparent layer side formed on the recording medium surface, is adopted.

That is, with the premise that the thickness of the transparent member on the laser beam irradiation side, that is, the light transmitting layer thickness is t, the skew margin SM is required to be SM $\lambda$/N. A. $^3$/t, or t is required to be set at a small value when the wavelength $\lambda$ is short and the N. A. is high. Therefore, the front surface irradiation is adopted for the laser beam irradiation from the substrate 1 side with a thick thickness.

The substrate 1 comprises a polycarbonate (PC) substrate formed by, for example, injection molding in consideration of mass productivity, or the like. A land 5L and a groove 5G are formed on the surface thereof simultaneously at the time of forming the substrate. Moreover, in this case, the widths of the land 5L and the groove G are optimally formed for preferably and stably recording on both land 5L and groove 5G.

In this example, the wavelength $\lambda$ of the irradiation laser beam with respect to the optical disc is 405 nm of the case an optical system with a 0.85 numerical aperture N. A. of the optical lens system 10 is used. In the description hereafter, the reflectance of the material is of the case with $\lambda$ being 405 nm.

In such an optical system, for ensuring the above-mentioned skew margin, the thickness t of the light transmitting layer 4 is set at a sufficiently small level, such as 10 $\mu$m to 177 $\mu$m as already reported. In this example, it is set at 100 $\mu$m.

The light transmitting layer 4 is made, for example, with an ultraviolet ray curing resin, or by attachment of a PC sheet.

The dielectric layer 3 is made, for example, of an $SiO_2$ layer having a 100 nm thickness, capable of providing the effect of blocking dissolution of the ultraviolet ray curing resin in the light transmitting layer 4. Since the dielectric layer 3 has the substantially same reflectance as, for example, that of the light transmitting layer 4 of the ultraviolet ray curing resin, the light transmitting layer 4 and the dielectric layer 3 can be regarded optically as a single layer.

The dielectric layer 3 can also comprises a transparent material layer made of, for example, an MgF.

As a method for forming the organic pigment layer 2 of the organic material layer, for example, the spin coat method, and the deposition method can be presented. As mentioned above, in the case of adopting the mode of forming a recording area in both land and groove as mentioned above, it is preferable to adopt the deposition method, capable of forming a film by an uniform thickness on both land and groove.

However, when the spin coat method is to be undertaken, signals of the same amplitude can be obtained from both land and groove by optimizing both recording area widths of the land and groove, the groove depth, and the spin coat conditions.

An optical recording medium according to the present invention directly reads out as the change of the reflectance without using the phase modulation method. The optical recording medium has been realized by the discussion on use of an organic pigment material of an organic material layer in the reflectance modulation method.

That is, the organic material (organic pigment material) is, for example, an organic material the reflectance of which is about 20% before recording, and changed to about 0% after recording with respect to a laser beam of a 400 nm wavelength.

Furthermore, in the present invention, this characteristic is realized not by adopting a reflection film used in the conventional optical recording medium, but by optimizing the optical characteristic of the organic pigment material. The feature of the present invention lies therein.

Thereby, the complete compatibility with respect to the phase change type recording medium can be realized.

Next, the optical characteristic of the organic substance material, that is, the organic pigment material to be matched with such a condition will be explained with reference to FIG. 2.

FIG. 2 shows the change of the reflectance R by three-dimensional plotting, with the film thickness d of the organic pigment material layer plotted in the lateral axis, and the real part of the complex refractive index (refractive index n) plotted in the vertical axis. In this case, the imaginary part of the complex refractive index (extinction coefficient (absorption coefficient) k) is set at 0.05. From FIG. 2, in order to change the refractive index from 20% to 5% in such a film configuration, when the film thickness d is, for example, 120 nm, one having the refractive index changing from n=2.6 to n=2.1 is used.

It was confirmed that substantially no difference is observed in the extinction coefficient when it is in the range of 0$\leq$k$\leq$0.1.

As it is learned from FIG. 2, in order to obtain a 20% reflectance in this case, the refractive index should be 2.5 or more. Moreover, there is no upper limit for the refractive index to satisfy this condition. A larger refractive index can be used easily. However, in reality, it is not easy to find out an organic pigment material having a large refractive index at a wavelength in the vicinity of 400 nm, and thus freedom of the material selection is extremely small.

Figure 3:
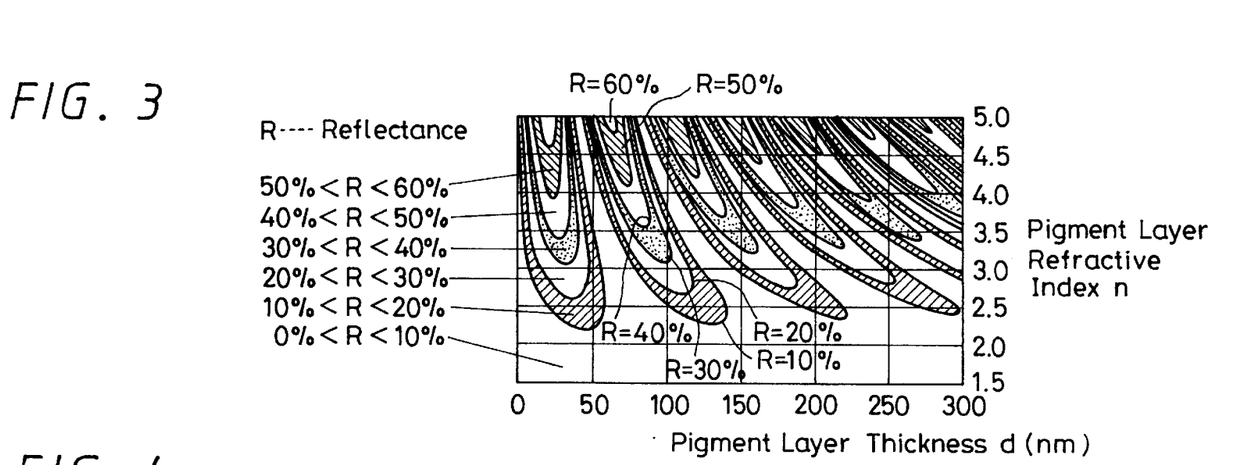
FIG. 3 is a graph showing the dependency of the reflectance on the organic pigment layer (organic material layer) thickness and the refractive index to be provided for explanation of the present invention.

Moreover, when the refractive index is high, as shown in FIG. 3, the margin of the reflectance with respect to the organic pigment material film thickness is narrowed. For example, if n=5.0, there is an area in which the reflectance changes by 20% only when the film thickness is changed only by 5 nm. In order to ensure the margin to some extent, it is preferable that n$\leq$4.0.

The decline of the margin at a high refractive index can be observed similarly in the following embodiments.

[Second Embodiment]

In this embodiment, an MgF (magnesium fluoride) film is formed between the organic pigment layer and the light transmitting layer.

The refractive index n of the MgF is n=1.38. By using the multiple interference in this layer, the reflectance condition can be satisfied with a lower organic material refractive index.

Figure 4:
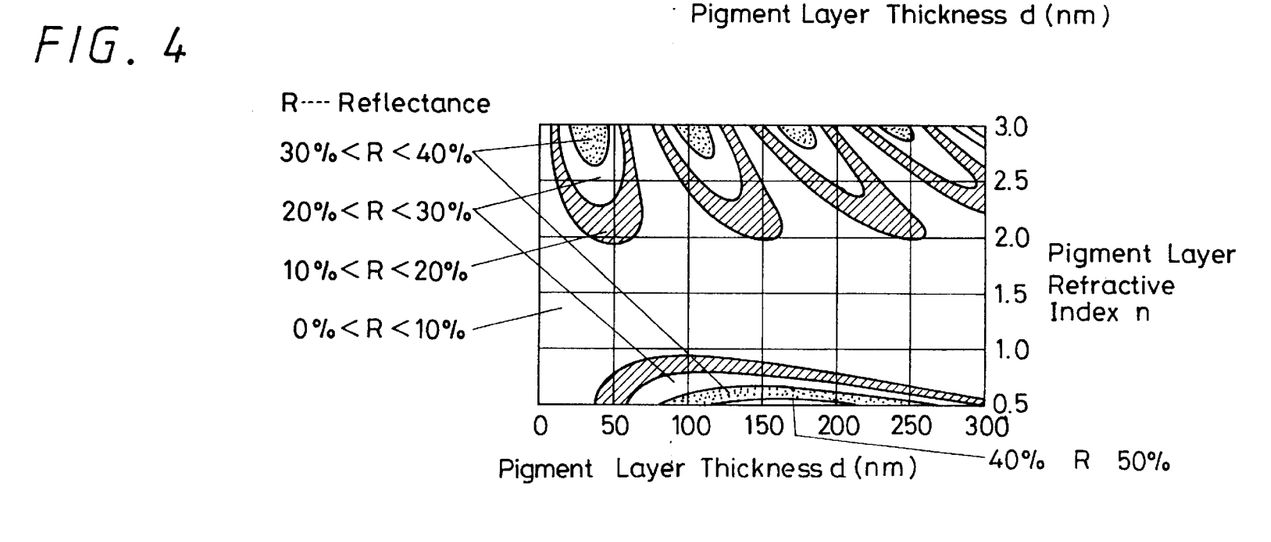
FIG. 4 is a graph showing the dependency of the reflectance on the organic pigment layer (organic material layer) thickness and the refractive index to be provided for explanation of the present invention.

FIG. 4 shows the case with an 80 nm MgF thickness. As shown in this figure, when the organic pigment material film thickness d is d=130 nm, one having the refractive index changing from n=2.3 to n=1.8 is used.

Accordingly, by using a material having a refractive index n lower than that of the substrate (n=1.5 in a PC substrate), the selected width of the refractive index can be widened. Also in this embodiment, similarly a solution for satisfying the reflectance condition when a refractive index is high exists.

In the first and second embodiments, a material having a refractive index n of an organic pigment material higher than the refractive index of a substrate is used. As an example of such a material, a triphenyl amine derivative can be used.

[Third Embodiment]

In this embodiment, the organic pigment layer is formed so as to be interposed between silver (Ag) thin films. In the case of a laser beam wavelength λ=405 nm, the refractive index of the Ag is 0.173, and the extinction coefficient is 1.95. By using the multiple interference by these layers, the multiple interference effect can be obtained more remarkably than the second embodiment so that the reflectance condition can be satisfied with a lower refractive index.

FIG. 4b shows the case with a 12 nm Ag film thickness on the substrate side and a 10 nm Ag film thickness on the light incident side. As shown in this figure, in the case the organic pigment film thickness is 80 nm, in order to change the refractive index from 20% to 5%, one having the refractive index changing from n=1.8 to n=1.55 is used. In this embodiment, although the margin with respect to the Ag film thickness is narrowed, in contrast, an advantage of obtaining a high modulation degree with a small refractive index change can be provided. Accordingly, by actively utilizing the multiple interference, the case with a low pigment refractive index can also be dealt with.

In this case, as to a cyanine material used in an ordinary CD-R, it is difficult to realize a high refractive index with respect to such a short wavelength light.

Figure 5:
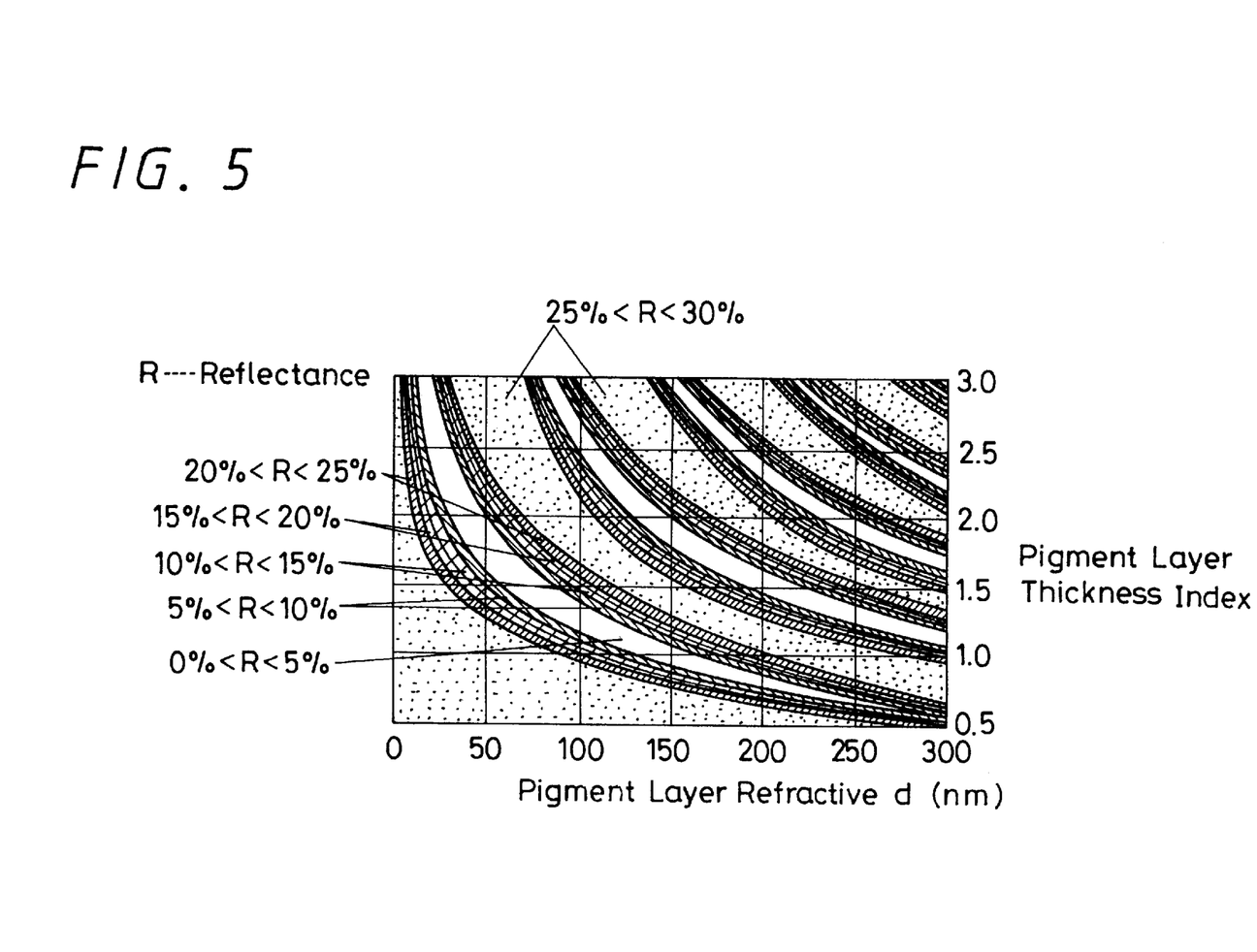
FIG. 5 is a graph showing the dependency of the reflectance on the organic pigment layer (organic material layer) thickness and the refractive index to be provided for explanation of the present invention.

FIG. 5 show a wavelength dispersion of the optical constant of a typical cyanine based material. The characteristic thereof is the refractive index change at the wavelength showing the absorption peak. Ordinarily, an irradiation light on the longer wavelength side with respect to the peak is to be used. In order to cope with a short wavelength, the molecular structure needs to be made smaller, however, since there is a limitation for that, it is difficult to realize the above-mentioned refractive index at 400 nm.

In contrast, in the present spectrum, as shown in FIG. 5, the refractive index is less than 1.5 in the vicinity of 400 nm.

Next, the case will be illustrated in which an optical recording medium according to the present invention comprises a cyanine based organic pigment material.

[Forth Embodiment]

Although this embodiment has the same structure as in the first embodiment, as the organic pigment material, a cyanine based pigment having a refractive index lower than 1.5, a 1-butyl-2-[5-(-1-butyl-3,3-dimethyl benz[e]indoline-2-iridene)-1,3-pentadienyl]-3,3-dimethyl-1H-benz[e] indorium perchlorate is used. The optical characteristic thereof is as shown in FIG. 2. When the organic pigment material film thickness d is d=100 nm, an organic pigment material that changes from n=0.9 to n=1.2 is used in order to obtain the change from 20% to 5% of the reflectance. However, such an organic pigment material with a low refractive index is low in terms of the freedom of selection.

Then, a configuration by the multiple interference effect will be put in place. Next, an embodiment of this case will be explained.

[Fifth Embodiment]

In this embodiment, a light transmitting layer having a refractive index higher than the refractive index of a substrate is disposed adjacent to the organic pigment layer in the material of the third embodiment for improving the same by the light interference effect.

Figure 6:
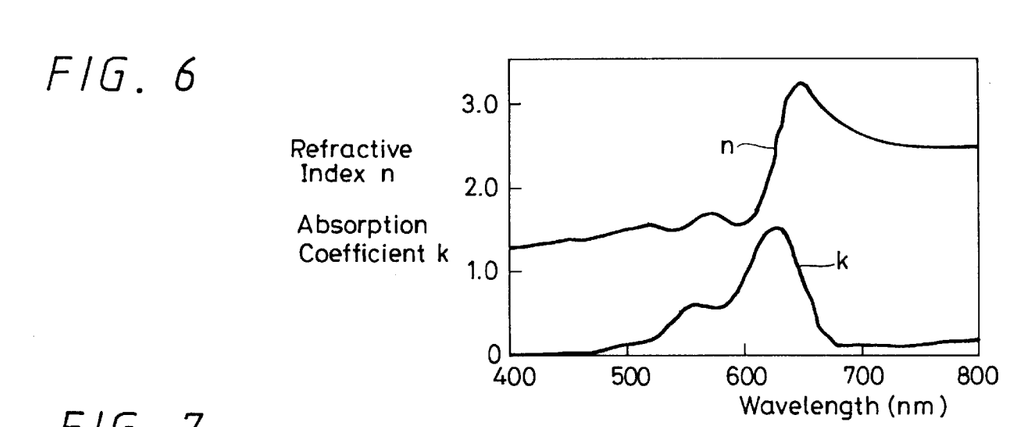
FIG. 6 is a graph showing the dependency of the refractive index n and the absorption coefficient k of the organic pigment layer (organic material layer) on the wavelength to be provided for explanation of the present invention.

As the high refractive index material, an $Si_3N_4$ (n=2.0) is used. In order to maximize the interference effect, the film thickness is set at 150 nm. As a result, as shown in FIG. 6, a reflectance higher than the case of FIG. 2 can be realized at a refractive index close to 1.5.

More specifically, with the organic pigment material film thickness d as d=80 nm, an organic pigment material that changes from n=1.2 to n=1.6 is used in order to obtain the change of the reflectance from 20% to 5%.

In the above-mentioned first to fourth embodiments, the ratio of the difference $\Delta=|n_a-n_b|$ of the real part of the complex refractive index after recording $n_a$ and the real part of the complex refractive index before recording $n_b$, that is, $|n_a-n_b|/n_b$ is 0.16 or more in all cases.

Moreover, since the maximum reflectance change can be obtained by the approach to 1.5 of the refractive index after recording $n_a$, $\Delta n/n_b$ of 0.62 or less is sufficient for the refractive index change as to a material with a refractive index $n_b$=4.0. That is, one satisfying the refractive index change $0.16 \leq \Delta n/n_b \leq 0.62$ satisfies the reflectance change condition.

Next, an embodiment for optimizing the imaginary part k of the complex refractive index (absorption coefficient) from the thermal aspect will be explained.

[Sixth Embodiment]

This embodiment is a case where the absorption coefficient k is supposed to be 0.05 and 0.1. Thermal calculation is carried out to obtain the thermal characteristics. As the physical values to be used at the time, those obtained from an experiment are used. A calculation algorithm in accordance with the experiment is used (Y. Sabi et al., Technical Digest of ISOM/ODS. 1999. Kauai, P. 234). The heat conduction ratio of the organic pigment is the same as that of the substrate, which is 0.193 J/m·s·K.

A reproduction optical system with a laser beam wavelength λ=405 nm, an objective lens numerical aperture N. A.=0.85, a focal point linear velocity v=2.0 m/s, and a reproducing laser beam power $P_r$=0.3 mW is used.

As the reproducing laser beam power $P_r$, a typical reproduction power value in the similar optical system is used. As a matter of fact, an intensity lower than this is not practical since the noise component is made larger.

The refractive index of the organic pigment material is n=2.7, and the film thickness is d=100 nm. Thereby, the reflectance is set to be about 20%.

Figure 7:
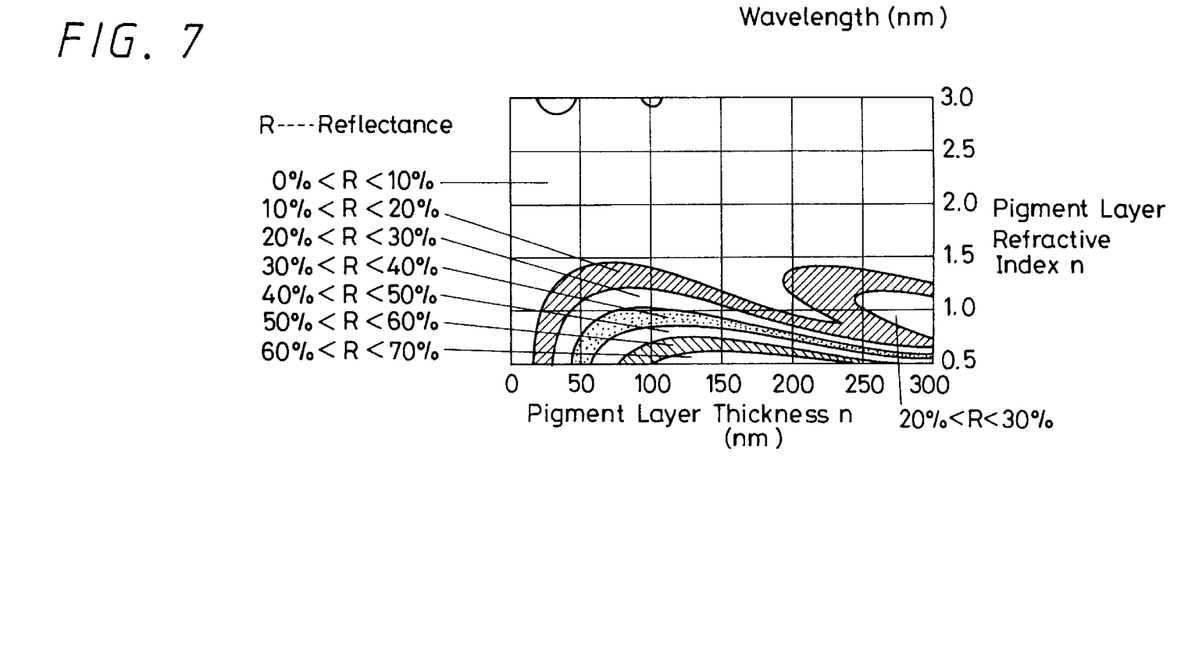
FIG. 7 is a graph showing the relationship between the refractive index n and the absorption coefficient k of the organic pigment layer (organic material layer) to be provided for explanation of the present invention.
Figure 8:
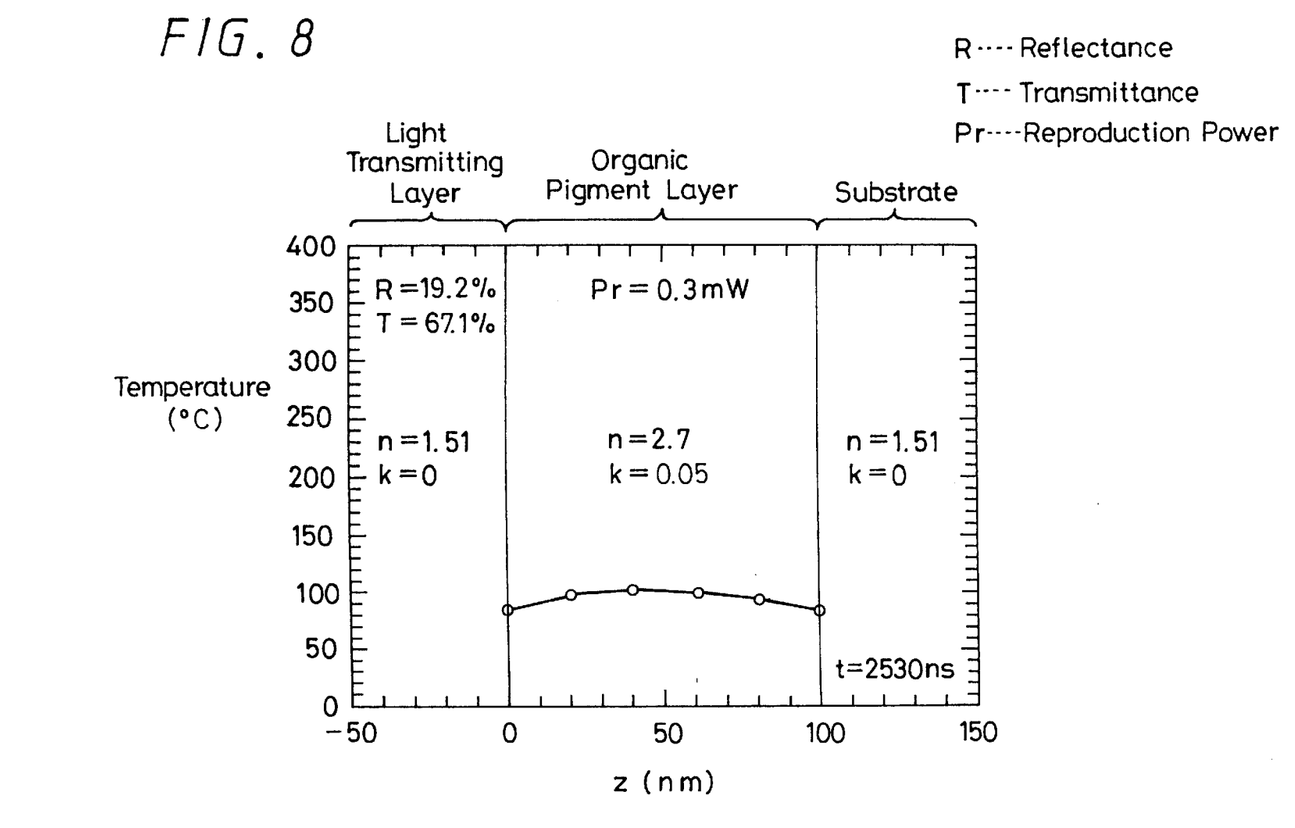
FIG. 8 is a graph showing the temperature distribution of an optical recording medium to be provided for explanation of the present invention.

As for the heat, distribution inside the organic pigment material layer in the cross-section perpendicular to the layer surface, that is, in a thickness direction z is found. The result is shown in FIGS. 7 and 8. FIG. 7 shows the case where the absorption coefficient k is 0.05, and FIG. 8 shows the case where the absorption coefficient k is 0.1. As it is observed from these figures, if the absorption coefficient k is more than 0.05, it exceeds 100° C. easily, but in consideration of the thermal decomposition rate of an ordinary organic pigment material being about 200° C., the temperature at the time of reproduction is preferably lower than 200° C.

However, since it already reaches 200° C. at the time of reproduction if the absorption coefficient k is 0.1, the absorption coefficient k in the practical use is preferably less than 0.1.

In contrast, in the case there is no absorption at all, no problem is involved as to the temperature reached at the time of reproduction, but the temperature is not raised also at the time of recording the information, and thus a problem arises in that recording is disabled or an extremely large recording power is required. As it is shown by the examples of the absorption coefficient k of 0.05 and 0.1, if the heat and the absorption coefficient k are in the proportional relationship in this region, in order to enable recording, $k \geq 0.01$ is preferable.

Moreover, the maximum film thickness as the recording film is preferably about 250 nm since the focal depth is also short in an optical system with a high N. A.

Next, there will be observed the case in which a film thickness of the organic pigment layer is thin as the organic material layer.

[Seventh Embodiment]

Figure 9:
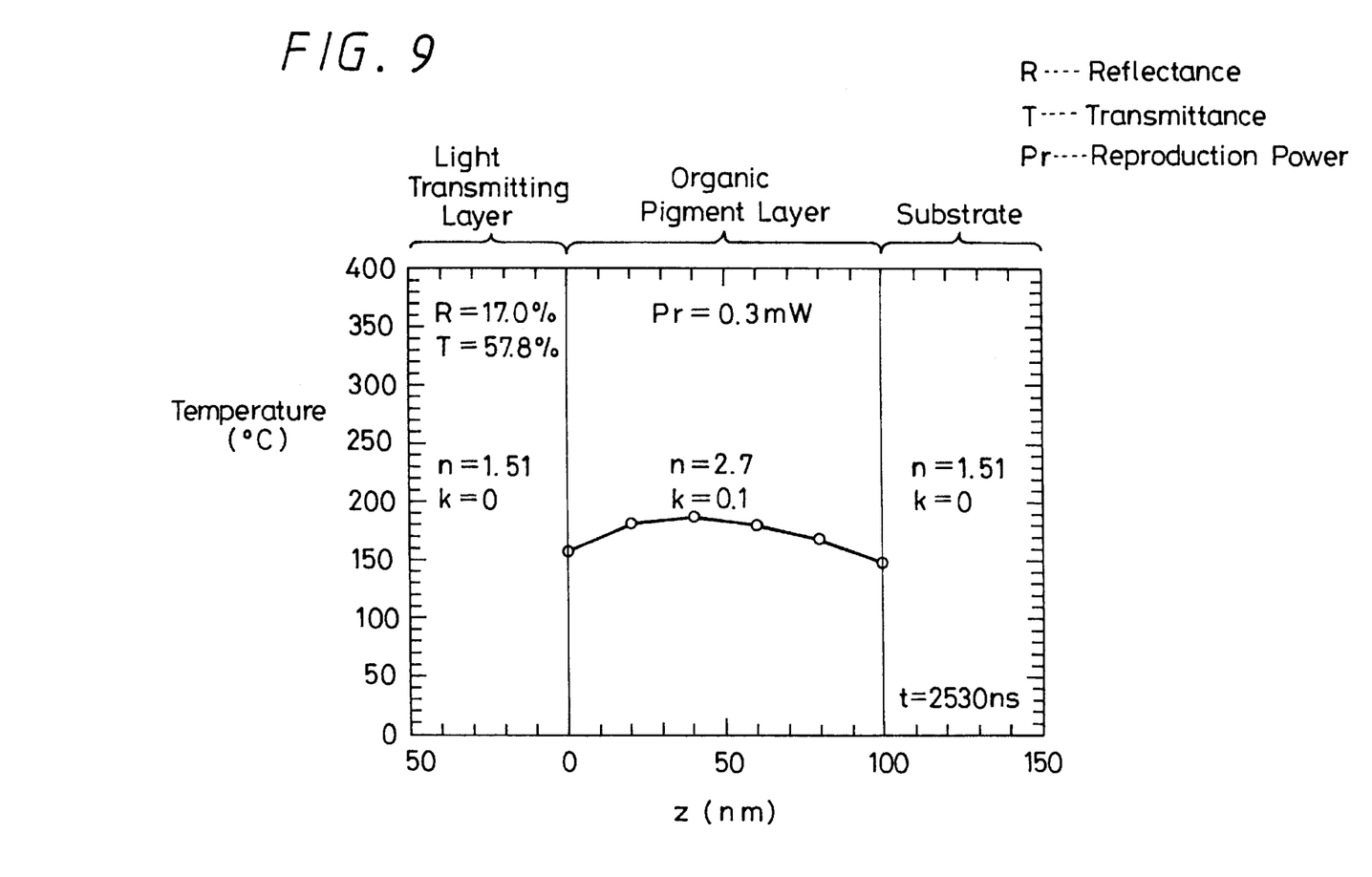
FIG. 9 is a graph showing the temperature distribution of an optical recording medium to be provided for explanation of the present invention.
Figure 10:
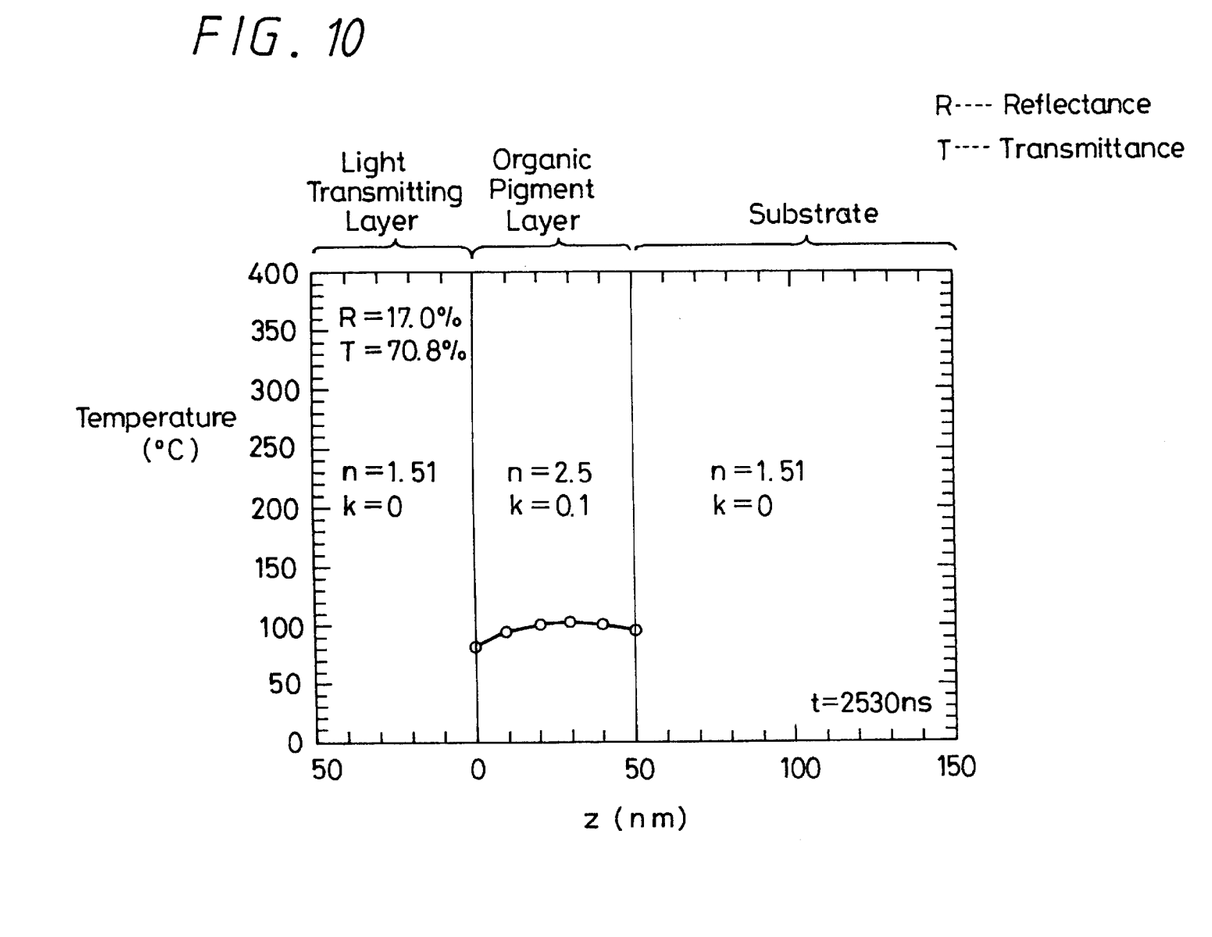
FIG. 10 is a graph showing the temperature distribution of an optical recording medium to be provided for explanation of the present invention.
Figure 11:
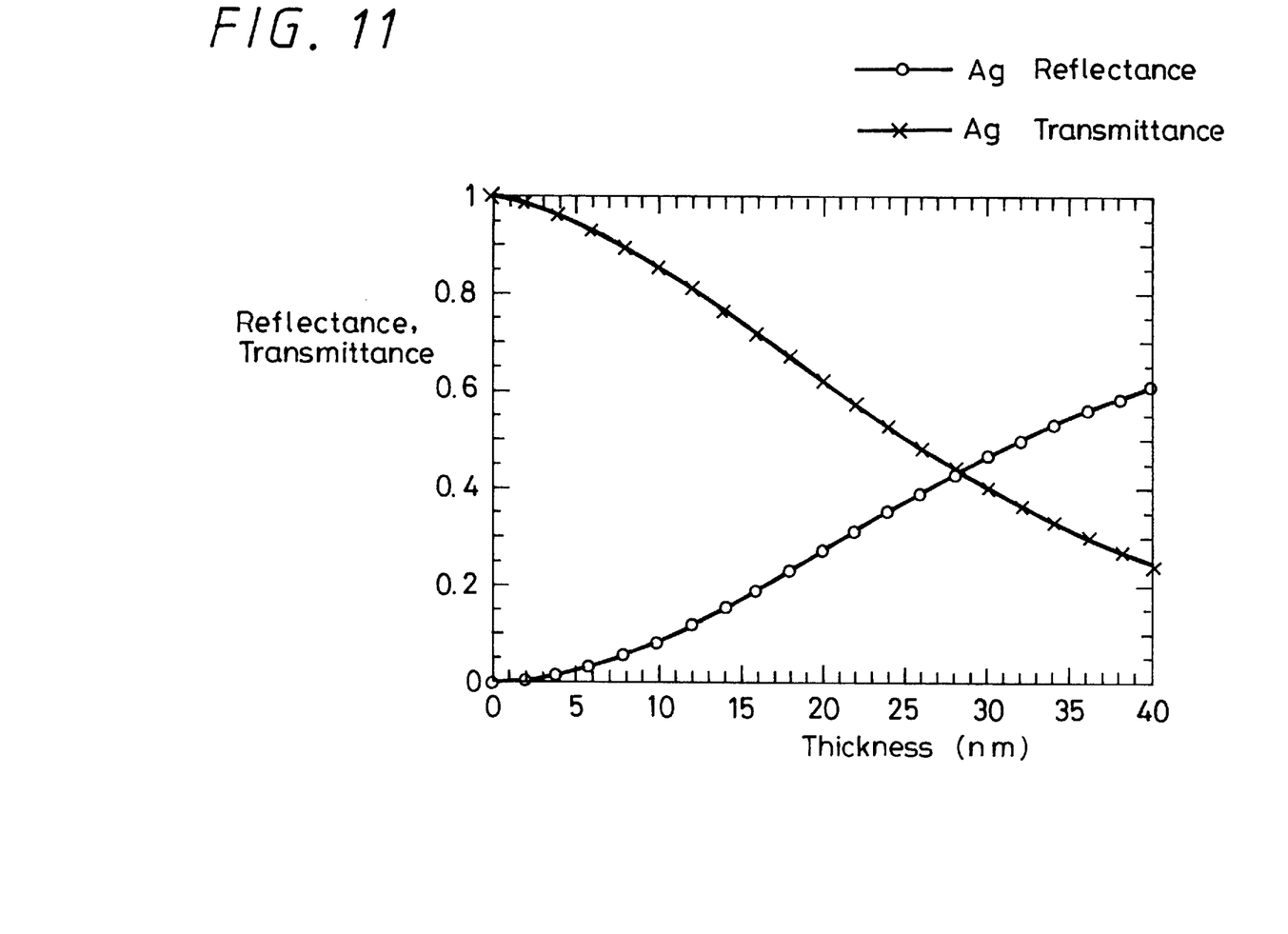
FIG. 11 is a graph showing the relationship between the reflectance and the transmittance of the Ag, and the thickness.

The film thickness is set at 50 nm, and k=0.1. The result is shown in FIG. 9. According thereto, since the rate of the heat dispersion in the substrate is sufficiently high in the case the film is thin like this, the temperature reached is lowered to about half. Therefore, even in the case k=0.2, the temperature can be controlled. In order to realize such a film thickness, the film is formed rather by deposition than by spin coat. The thickness of the film to function as a recording film provided by deposition can be as thin as about 10 nm. In the film thickness range, the temperature can be controlled even in the case of $0.01 \leq k \leq 0.2$.

Next, the transmittance will be discussed.

An optical recording medium according to the present invention basically comprises only an organic pigment layer. The transmittance thereof is high. For example, in the case of d=100 nm, n=2.7, k=0.05 in the fifth embodiment, the transmittance is 67% with respect to the 19% reflectance. Therefore, such an optical recording medium, for example, a disc can be comprised of a multiple layer recording structure with two or more organic material layers (organic pigment layers) which are laminated via, for example, a light transmitting layer each as a recording film for executing recording. For example, in the case of a two layer structure with first and second organic pigment layers, reproduction for the first organic pigment layer on the light incident side and reproduction for the second organic pigment layer by the laser beam transmitted through the first organic pigment layer can be executed by changing the focal point position. Furthermore, it can be designed so as to obtain a 20% reflectance from the second organic pigment layer.

In the above-mentioned embodiment, the remaining 12% light other than the 19% reflected light and the 67% transmitted light from the incident light energy is absorbed by the organic pigment layer. Thereby, the temperature reaches at 100° C. That is, in order to obtain a desired reached temperature, absorption by the organic film should be about 12%. However, if a reflection film made of an Al or an Ag used in the conventional optical discs is used as the reflection film, even in the case the reflectance is restrained to 20% by the multiple interference effect, the light energy absorption is 80%. Also by the influence of a low heat conductivity of the organic pigment film, the temperature is raised extremely. Therefore, in such a system, a reflection film cannot be used.

Moreover, also from the optical perspective, even if a metal film having a low reflectance is used when a wavelength is 400 nm (Cu, Au, or the like), the reflectance cannot be 20%.

[Eighth Embodiment]

In the above-mentioned first to fourth embodiments, the ratio of the difference $\Delta = |n_a - n_b|$ of the real part of the complex refractive index after recording $n_a$ and the real part of the complex refractive index before recording $n_b$, that is, $|n_a - n_b|/n_b$ is 0.16 or more in all cases.

Moreover, since the maximum reflectance change can be obtained by the approach to 1.5 of the refractive index after recording $n_a$, $\Delta n/n_b$ of 0.62 or less is sufficient for the refractive index change as to a material with a refractive index $n_b = 4.0$. That is, one satisfying the refractive index change $0.16 \leq \Delta n/n_b \leq 0.62$ satisfies the reflectance change condition.

Accordingly, in the case a thin metal film is used auxiliarily, since the reflectance from the metal film is not largely dependent on the kind of the metal, for example, if the reflectance is about 20%, a metal film with about a 20 nm film thickness D can be used. Although Cu is shown as the embodiment here, the same effect can be expected also when another metal is used. The reflectances of the organic material layers (organic pigment layers) when the film thicknesses of Cu are 20 nm and 10 nm are each shown in FIGS. 12 and 13.

Figure 12:
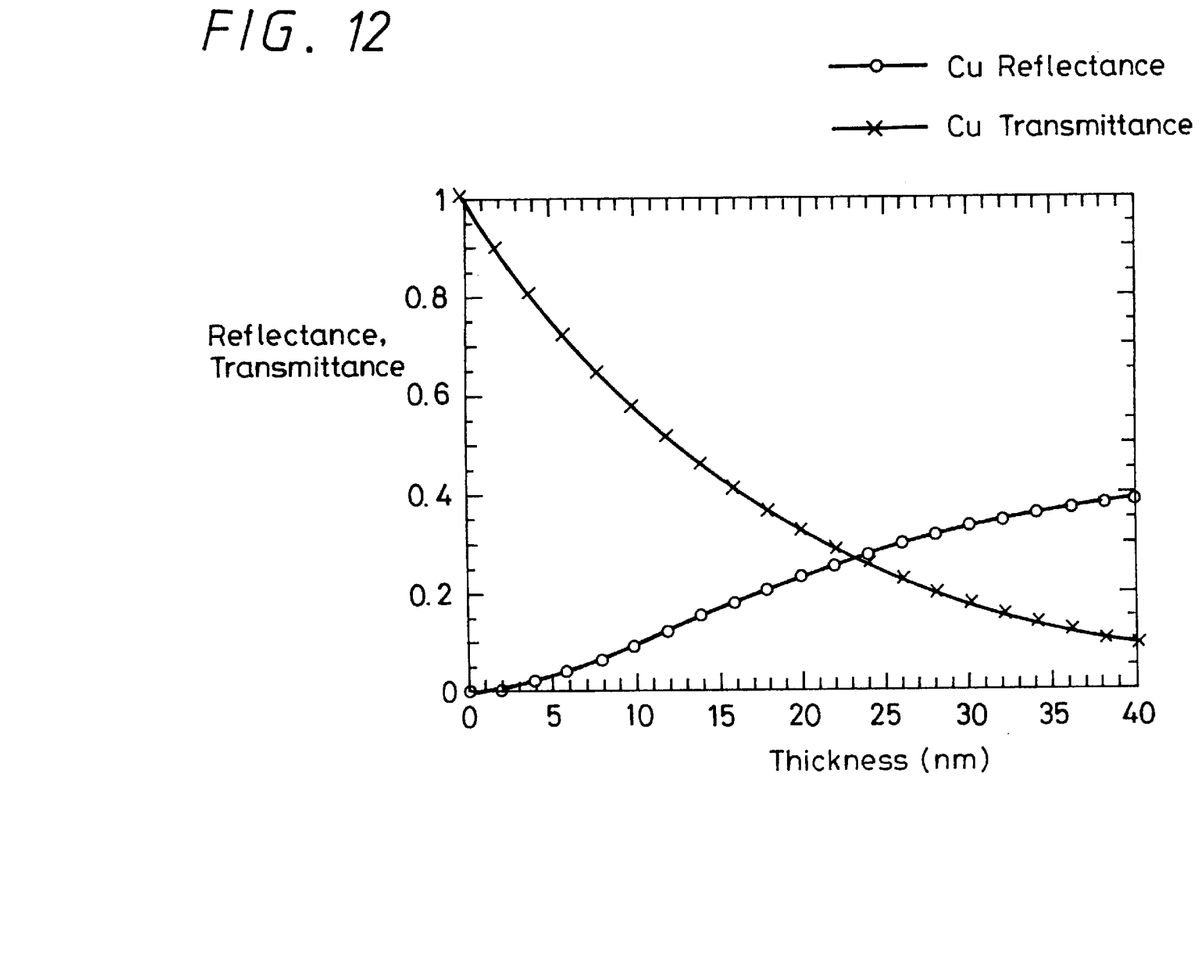
FIG. 12 is a graph showing th e relationship between the reflectance and the transmittance of the Cu, and the thickness.

In the case the metal film is 20 nm, since the reflectance of the metal layer alone exceeds 20%, the region exceeding 15% to be the reflectance before recording can be provided widely, however, in contrast, the range satisfying 0 to 10% to be the reflectance after recording is small. However, it is learned that the above-mentioned region with a 15% to 25% reflectance before decomposition, that is, before recording, and a 0% to 10% reflectance after decomposition, that is, after recording exists actually in this configuration.

That is, since the optical condition is satisfied, a metal film can be used, aiming at the thermal optimization.

In the case the Cu film thickness is thicker than 20 nm, since the region satisfying a 0 to 10% reflectance is narrowed so that an optical margin cannot be obtained, and thus it is not practical. Moreover, in the case the reflectance from the metal film is high, the problem of heat rise is generated as mentioned above. That is, in the case 12% of the incident light amount is absorbed in the organic pigment layer, the temperature is raised to 100° C., but if the reflection from the metal film is, for example, 25% and it is simply absorbed in the organic pigment, the temperature is raised to 300° C., triple as much as it is (in the case the room temperature is the offset temperature).

In reality, because of the optical multiple interference effect and the heat dispersion effect by disposing the organic pigment adjacent to the metal with a high heat conductivity, the temperature characteristic can be changed according to various parameters. In general, if the metal film thickness is more than 20 nm, detriments due to the rise in temperature derived from too high a reflectance is severe.

Figures 13, 14:
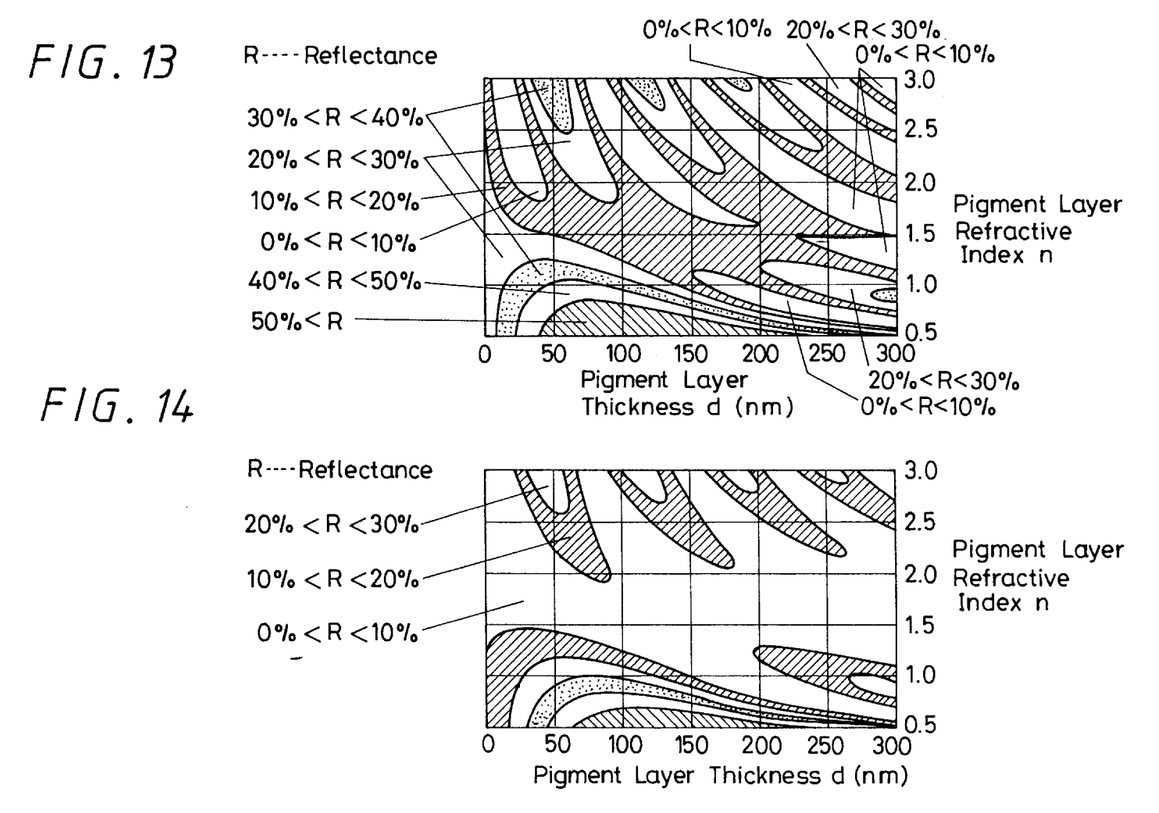
FIG. 13 is a graph showing the relationship between the refractive index n and the absorption coefficient k of the organic pigment layer (organic material layer) to be provided for explanation of the present invention.
FIG. 14 is a graph showing the relationship between the refractive index n and the absorption coefficient k of the organic pigment layer (organic material layer) to be provided for explanation of the present invention.

In the case the metal film thickness D is as thin as 10 nm, optically the reflection effect from the metal film is small so that as shown in FIG. 13, the region satisfying the reflectance condition after recording is further increased so that the film designing freedom is widened. Moreover, since the metal heat conductivity is sufficiently higher than that of the organic pigment, it is thermally advantageous, and thus it is further preferable.

In the case the metal film thickness D is less than 5 nm, the metal heat conductivity is extremely lowered so that the thermal effect is eliminated, and further, the reflection effect is eliminated also from the optical perspective, and thus it is preferable to use the metal film in a range more than 5 nm.

As apparent from the above-mentioned description, since an optical recording medium according to the configuration of the present invention can adopt a short wavelength laser beam by the structure and specification thereof, high density recording can be executed, and further, the complete compatibility with respect to a phase change recording medium can be achieved by reduction of the reflectance.

The optical recording medium according to the present invention is not limited to the above-mentioned embodiments, but needless to say, various configurations and modifications can be provided without departing from the configuration of the present invention.

As mentioned above, according to an optical recording medium according to the present invention, since high density light recording using a short wavelength (380 nm to 450 nm) laser beam can be realized as well as the complete compatibility with respect to a phase change material can be obtained, an optical recording medium with the excellent convenience can be provided.

Moreover, according to the present invention, since the land-groove recording can be executed, great advantageous effects in the practical use, such as a higher density can be provided.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An optical recording medium having a recording film on a substrate, which is mainly made of an organic material and decomposed after absorbing a laser beam to have a refractive index change, wherein reflectance of the optical recording medium with respect to a reproducing laser beam having a wavelength of 380 nm to 450 nm is 15% to 25% before the decomposition, and 0% to 10% after the decomposition, and the real part of the complex refractive index (refractive index $n_b$) before recording of the organic material is $1.8 \leq n_b \leq 4.0$ with respect to the reproducing laser beam.

2. An optical recording medium having a recording film on a substrate, which is mainly made of an organic material and decomposed after absorbing a laser beam to have a refractive index change, wherein reflectance of the optical recording medium with respect to a reproducing laser beam having a wavelength of 380 nm to 450 nm is 15% to 25% before the decomposition, and 0% to 10% after the decomposition, and the real part of the complex refractive index (refractive index $n_b$) before recording by the decomposition of the organic material is $0.5 \leq n_b \leq 1.2$ with respect to the reproducing laser beam.

3. An optical recording medium having a recording film on a substrate, which is mainly made of an organic material and decomposed after absorbing a laser beam to have a refractive index change, wherein reflectance of the optical recording medium with respect to a reproducing laser beam having a wavelength of 380 nm to 450 nm is 15% to 25% before the decomposition, and 0% to 10% after the decomposition, and the real part of the complex refractive index (refractive index $n_a$) after recording by the decomposition of the organic material and the real part of the complex refractive index (refractive index $n_b$) before recording are set at $0.16 \leq |n_a - n_b|/n_b \leq 0.62$ with respect to the reproducing laser beam wavelength.

4. An optical recording medium having a recording film on a substrate, which is mainly made of an organic material and decomposed after absorbing a laser beam to have a refractive index change, wherein reflectance of the optical recording medium with respect to a reproducing laser beam having a wavelength of 380 nm to 450 nm is 15% to 25% before the decomposition, and 0% to 10% after the decomposition, and the imaginary part of the complex refractive index (absorption coefficient k) before recording by the decomposition of the organic material is $0.01 \leq k \leq 0.1$ with respect to the reproducing laser beam wavelength, and the thickness d is 50 nm $\leq d \leq$ 250 nm.

5. An optical recording medium having a recording film on a substrate, which is mainly made of an organic material and decomposed after absorbing a laser beam to have a refractive index change, wherein reflectance of the optical recording medium with respect to a reproducing laser beam having a wavelength of 380 nm to 450 nm is 15% to 25% before the decomposition, and 0% to 10% after the decomposition, and the imaginary part of the complex refractive index (absorption coefficient k) before recording by the decomposition of the organic material is $0.01 \leq k \leq 0.2$ with respect to the reproducing laser beam, and the thickness d is 10 nm $\leq d \leq$ 50 nm.

6. An optical recording medium having a recording film on a substrate, which is mainly made of an organic material and decomposed after absorbing a laser beam to have a refractive index change, wherein reflectance of the optical recording medium with respect to a reproducing laser beam having a wavelength of 380 nm to 450 nm is 15% to 25% before the decomposition, and 0% to 10% after the decomposition, and the organic material layer is provided in at least two or more layers, with a light transmitting layer provided between the organic material layers.

* * * * *